United States Patent
Di Martino et al.

(10) Patent No.: US 9,062,204 B2
(45) Date of Patent: Jun. 23, 2015

(54) PROCESS FOR THE MANUFACTURE OF A POLYAMIDE

(75) Inventors: Audrey Di Martino, Decines (FR); Thierry Charbonneaux, Lyons (FR); Jean-François Thierry, Francheville (FR)

(73) Assignee: RHODIA OPERATIONS, Paris (FR)

( * ) Notice: Subject to any disclaimer, the term of this patent is extended or adjusted under 35 U.S.C. 154(b) by 156 days.

(21) Appl. No.: 13/695,334

(22) PCT Filed: Apr. 21, 2011

(86) PCT No.: PCT/EP2011/056409
§ 371 (c)(1),
(2), (4) Date: Jan. 15, 2013

(87) PCT Pub. No.: WO2011/134883
PCT Pub. Date: Nov. 3, 2011

(65) Prior Publication Data
US 2013/0184413 A1     Jul. 18, 2013

(30) Foreign Application Priority Data

Apr. 30, 2010 (FR) .................................... 10 53371

(51) Int. Cl.
*C08G 69/36* (2006.01)
*C08L 77/06* (2006.01)
*C08G 69/02* (2006.01)
*C08G 69/46* (2006.01)

(52) U.S. Cl.
CPC ................ *C08L 77/06* (2013.01); *C08G 69/02* (2013.01); *C08G 69/36* (2013.01); *C08G 69/46* (2013.01)

(58) Field of Classification Search
USPC .................. 528/310, 312, 313, 315, 318, 323
See application file for complete search history.

(56) References Cited

U.S. PATENT DOCUMENTS

| | | | |
|---|---|---|---|
| 4,001,192 A | 1/1977 | Reske et al. | |
| 4,442,260 A | 4/1984 | Larsen | |
| 5,039,786 A | 8/1991 | Pipper et al. | |
| 5,306,804 A | 4/1994 | Liehr et al. | |
| 5,432,254 A | 7/1995 | Liehr et al. | |
| 5,723,569 A | 3/1998 | Sato et al. | |
| 6,107,449 A | 8/2000 | Wiltzer et al. | |
| 6,191,251 B1 | 2/2001 | Pagilagan | |
| 2005/0209436 A1 | 9/2005 | Wilzer | |
| 2010/0168375 A1* | 7/2010 | Thierry | ........................ 528/335 |

FOREIGN PATENT DOCUMENTS

| | | |
|---|---|---|
| JP | 61-243827 A | 10/1986 |
| WO | 03/080707 A1 | 10/2003 |

OTHER PUBLICATIONS

International Search Report issued on Oct. 24, 2011, by the European Patent Office as the International Searching Authority in International Patent Application No. PCT/EP2011/056409.
Kristofic et al. "Thermal properties of poly-$\epsilon$-caprolactam and copolyamides based on $\epsilon$-caprolactam," J. Therm. Anal. Calorim., 2009, pp. 145-150, vol. 98.
Fukumoto, Osamu, "Plastic Material Course 16 Polyamide resin:" Nikkan Kogyo Shimbun, Ltd., Aug. 30, 1980, Fifth Edition. pp. 27-28 (partial translation).

* cited by examiner

*Primary Examiner* — Gregory Listvoyb

(57) ABSTRACT

A process is described for producing a polyamide from at least one diacid and from at least one diamine. The process can include introducing a lactam and/or an amino acid after a step of concentrating an aqueous solution of a salt of diacid and diamine.

15 Claims, No Drawings

PROCESS FOR THE MANUFACTURE OF A POLYAMIDE

CROSS-REFERENCE TO PRIOR APPLICATIONS

This application is a National Stage of PCT/EP2011/056409, filed Apr. 21, 2011, and designating the United States (published in French on Nov. 3, 2011, as WO 2011/134883 A2; the title and abstract were published in English), which claims priority to FR 1053371, filed Apr. 30, 2010, each hereby expressly incorporated by reference in its entirety and each assigned to the assignee hereof.

The present invention relates to a process for the manufacture of polyamide.

The invention relates more particularly to a process for the manufacture of polyamide from at least one diacid and from at least one diamine, comprising the introduction of lactam at the end of or after a stage of concentration of an aqueous solution of salt of diacid and diamine.

Polyamides are polymers of considerable industrial and commercial importance. Thermoplastic polyamides are obtained by condensation of two different types of monomers or of just one type of monomer. It is possible to envisage having several different monomers in one and the same type.

The invention applies to polyamides resulting from two different types of monomers, such as, for example, poly(hexamethylene adipamide).

Conventionally, polyamides are prepared from at least one diacid monomer and from at least one diamine monomer, in solution generally in water.

The diacid is a dicarboxylic acid. The commonest diacid monomer is adipic acid.

With regard to the diamine monomer, it is generally hexamethylenediamine.

In addition to adipic acid (AA) and hexamethylenediamine (NMDA), polyamides can result from other diamine or diacid monomers or even from amino acid monomers or lactams (up to 25 mol %). These other monomers can modify, for example, the behaviour towards crystallization of the final polymer.

The most widespread industrial process for the manufacture of polyamide from two different monomers, a diacid and a diamine, consist in forming a salt between the diacid and the diamine: for example, hexamethylenediammonium adipate, better known under the name of "N salt" or Nylon salt. This salt is generally employed in aqueous solution. The salt solution generally comprises stoichiometric amounts of diacids and diamines. The solution of this "N salt", which comprises at least 40% by weight of "N salt", is generally concentrated by evaporation of water. The polyamide is obtained by heating, at high temperature and high pressure, this concentrated solution of "N salt" in order to evaporate the water and to activate the polymerization reaction, while keeping the medium in the liquid state.

After concentration, the solution of "N salt" generally comprises between 55 and 90% by weight of salt.

During the phase of polymerization by heating the solution at high temperature and high pressure, the water still present in this solution and the water generated by the polymerization reaction are removed.

When a polyamide is manufactured from two different monomers, a diacid and a diamine, and when it is also desired to introduce lactam comonomers, in particular in a large amount, it is known to add them as a mixture with the starting salt of diacid and diamine, before the beginning of the process for the manufacture of polyamide. Specifically, it is known to mix these lactam comonomers with the solution of N salt, for example, before the stage of concentration of this solution.

However, the lactam, thus added as a mixture with the starting salt of diacid and diamine, can, due to its volatility, be entrained with the water evaporated during the stage of concentration of the solution of monomers. This entrainment results in lactam losses.

In order to compensate for these losses, it is necessary to introduce the lactam comonomer in excess with respect to the amount of monomer units resulting from the lactam comonomer desired in the final polyamide, since a portion of these comonomers introduced at the start will be lost during the stage of concentration of the solution of monomers.

These lactam losses become greater in absolute value as the desired amount of monomer units resulting from the lactam comonomer in the final polyamide increases.

Consequently, the excess of comonomers to be employed before the beginning of the process, in order to compensate for these higher losses, will itself also become greater in absolute value.

This renders the process complex and not very economical from the viewpoint of the starting materials. Furthermore, effluents comprising lactam are generated during the stage of concentration of the solution of monomers and the management of these effluents is restricting.

Solutions are thus being sought to this problem of lactam losses, which is more particularly posed for the production of polyamides from diacids and diamines into which it is desired to introduce high amounts of lactam comonomers.

In order to solve this problem, the invention provides a process for the manufacture of polyamide from at least one diacid, from at least one diamine and from at least one lactam, comprising the following stages:
  a) concentration, by evaporation of water, of an aqueous solution of salt of diacid and diamine obtained by mixing at least one diacid and at least one diamine,
  b) polymerization, under pressure, of the concentrated aqueous solution,
  c) reduction in pressure of the polymerization medium in order to remove the residual water by evaporation,
  d) optionally maintenance at temperature of the polymer, at atmospheric pressure or under reduced pressure, in order to obtain the desired degree of polymerization,
  e) optionally forming of the polymer obtained,
characterized in that the lactam is introduced into the solution or the polymerization medium at the end of stage a) or after stage a);
and in that the proportion of monomer units resulting from the lactam in the final polymer, by weight with respect to the weight of final polymer, is between 2.5 and 25%, advantageously between 3 and 20%, preferably between 5 and 20% and more preferably still between 10 and 15%.

This process, according to which the lactam is introduced at the end of or after the stage a) of concentration of the solution of monomers makes it possible to limit, indeed even to eliminate, the problem of lactam losses during this stage which existed in the prior processes. This renders the process simpler and more economical, as indicated above.

The term "weight of final polymer" is understood to mean the total weight of the monomer units constituting the polymer chain. The monomer units constituting the polymer chain can, for example, be dicarboxylic acid units, diamine units or amino acid units.

The term "at the end of stage a)" is understood to mean "when more than 50% by weight, preferably at least 80% by weight, of the water which it is desired to evaporate during stage a) has been evaporated".

Within the meaning of the present invention, in order to obtain a polyamide from at least one diacid, from at least one diamine and from at least one lactam for which the fraction of monomer units resulting from the lactam in the final polymer, by weight with respect to the weight of final polymer ($Y_{lactam}$), is between 0.025 and 0.25 (in other words, a proportion of between 2.5 and 25%), the amount by weight of lactam to be introduced ($A_{lactam\ introd.}$) is calculated in the following general way:

$$A_{lactam\ introd.} = A_{th\ lactam} + A_{lactam\ losses}$$

with $A_{th\ lactam} = W_{PA} \times Y_{lactam}$ $W_{PA}$=weight of polyamide to be produced $Y_{lactam}$=fraction by weight of monomer units resulting from the lactam in the final polymer $A_{lactam\ losses}$ corresponds to the losses related to the process, in particular to the evaporation of the lactam during the phases of removal of the water from the salt solution and of the water produced by the polycondensation reaction of the diacid(s) and of the diamine(s). This amount can, for example, be determined by chromatographic quantitative determination of the lactam in this water recovered after condensation. The exact amount of lactam to be introduced can thus be adjusted so as to obtain the desired fraction, $Y_{lactam}$, of monomer units resulting from the lactam in the final polymer.

As regards the amount of salt of diacid and diamine introduced, $A_{salt\ introd.}$ with respect to $W_{PA}$, $Y_{salt}$, $M_{PA\ salt}$ and $M_{salt}$, the latter two quantities being respectively the molar mass of the monomer units resulting from the salt of diacid and diamine and the molar mass of the salt of diacid and diamine, the following calculation is carried out:

$$A_{salt\ introd.} = (W_{PA} \times Y_{salt} \times M_{salt})/(M_{PA\ salt} \times F_{salt})$$

$W_{PA}$=weight of polyamide to be produced $Y_{salt}$=fraction by weight of monomer units resulting from the salt in the final polymer, $F_{salt}$=fraction by weight of the salt in the aqueous solution Advantageously, the lactam is introduced before the optional stage d), which is a finishing stage. Thus, the copolymer is prepared under good conditions. The lactam can, for example, be introduced at the beginning of stage c) of reduction in pressure.

The solution of salt of diacid and diamine is manufactured according to a process known to a person skilled in the art. It can be prepared by addition of the diacid, in particular adipic acid, to the diamine, in particular hexamethylenediamine, or vice versa, in aqueous medium, the heat produced by the neutralization reaction being or not being removed.

Advantageously, the aqueous solution of salt of diacid and diamine, before it is concentrated according to stage a), does not comprise lactam.

Stage a) of concentration of the process of the invention is generally carried out in an "evaporator", a device known to a person skilled in the art. It can, for example, be a static evaporator with an internal heat exchanger of coil type, an evaporator with a loop for recirculation through an external exchanger, and the like.

The solution, during stage a), is advantageously kept stirred. This makes possible good homogenization of the solution. The stirring means are the means known to a person skilled in the art; they can, for example, be mechanical stirring or recirculation via a pump or via a thermosiphon.

The solution introduced in stage a) can be a preheated solution.

The salt solution is advantageously maintained, in stage a), at a temperature and at a pressure which are sufficient to maintain the medium in the liquid state and to prevent any appearance of solid phase.

The concentration by weight of salt in the aqueous solution of salt of diacid and diamine, before stage a), can vary from 40 to 70%. It is advantageously between 50 and 70%.

The concentration by weight of salt in the aqueous solution is understood to mean concentration by weight in the water of the dissolved entities.

The term "dissolved entities" should be understood as meaning all the diacid and diamine entities present in the medium in the free or ionized (salt) or other form, disregarding the lactam optionally present.

Stage a) of concentration is preferably carried out while keeping the solution under an atmosphere devoid of oxygen, so as to prevent any contact of the solution with oxygen. This is carried out, for example, by employing, in the process of the invention, a salt devoid of dissolved oxygen or by employing an atmosphere of inert gas or of steam generated by the boiling of the solution.

The concentration by weight of salt in the aqueous solution of salt of diacid and diamine, after stage a), is preferably between 55 and 90%.

The increase in the concentration by weight of salt in the aqueous solution of salt of diacid and diamine during stage a) of concentration is preferably from 10 to 50%, in particular from 15 to 40% (expressed as absolute value of concentration by weight of salt in the aqueous solution).

According to a specific embodiment of the process of the invention, the lactam is introduced before stage b) of polymerization under pressure.

The mixture resulting from stage a) is preferably transferred from the evaporator to a reaction chamber in which stage b) of polymerization takes place with removal of water.

The lactam can, for example, be introduced into the evaporator at the end of stage a) of concentration; into the evaporator when stage a) of concentration is complete and before the mixture resulting from stage a) is transferred from the evaporator to the reaction chamber; or during the transfer of the mixture resulting from stage a) from the evaporator to the reaction chamber.

Stages b) to d) are carried out, preferably, in a device or several successive devices providing the functions of polymerization, reduction in pressure and finishing, according to the usual conditions of the polycondensation process. In particular, stage b) is carried out in a "polymerizer". The "polymerizer" can be an autoclave or a continuous reactor. The evaporator can feed several "polymerizers".

Stage b) of polymerization consists of a polycondensation under pressure. The pressure during this stage b) is generally between 1.5 and 2.5 M Pa.

Stage c) of reduction in pressure consists of a decompression of the polymerization medium in order to remove the residual water by evaporation.

According to stage d), the polyamide can subsequently be kept for a predetermined time at a polymerization temperature at atmospheric pressure or under reduced pressure in order to obtain the desired degree of polymerization. Stage d) is referred to as finishing.

These stages are known to a person skilled in the art and are those used in conventional industrial processes for the manufacture of polyamide from an aqueous solution of salt of diacid and of diamine.

Advantageously, the appliances of the process of the invention are provided with thermal insulation in order to limit the exchanges of heat with the external environment and thus to limit heat losses.

The process of the invention can be a continuous or batch process.

The process of the invention can be used for the manufacture of poly(hexamethylene adipamide) from adipic acid as diacid monomer and from hexamethylenediamine as diamine monomer.

Mention may also be made, as diacid monomer, in addition to adipic acid, of glutaric, suberic, sebacic, dodecanedioic, isophthalic, terephthalic, azelaic, pimelic, naphthalenedicarboxylic or 5-sulphoisophthalic acid, for example. It is possible to use a mixture of several diacid monomers.

Advantageously, the diacid monomer comprises at least 80 mol % of adipic acid.

Mention may also be made, as diamine monomer, in addition to hexamethylenediamine, of heptamethylenediamine, tetramethylenediamine, pentamethylenediamine, octamethylenediamine, nonamethylenediamine, decamethylenediamine, 2-methylpentamethylenediamine, undecamethylenediamine, dodecamethylenediamine, xylylenediamine or isophoronediamine. It is possible to use a mixture of several diamine monomers.

Advantageously, the diamine monomer comprises at least 80 mol % of hexamethylenediamine.

Mention may be made, as lactam comonomer, in addition to caprolactam, of dodecanolactam, butyrolactam, valerolactam and undecanolactam. It is possible to use a mixture of several lactam comonomers.

Advantageously, the lactam comonomer comprises at least 80 mol % of caprolactam.

The lactam comonomer is generally introduced in the form of an aqueous solution or in the molten form. Advantageously, the aqueous lactam solution comprises between 60 and 80% by weight of lactam.

Other comonomers can be introduced during the process of the invention. Mention may be made, by way of example, of 6-aminohexanoic acid, 5-aminopentanoic acid, 7-aminoheptanoic acid or 11-aminoundecanoic acid.

Additives can be introduced during the process of the invention. Mention may be made, as examples of additives, of nucleating agents, such as talc, matifying agents, such as titanium dioxide or zinc sulphide, heat or light stabilizers, bioactive agents, soil-release agents, catalysts, chain-limiting agents, and the like. These additives are known to a person skilled in the art. This list does not have any exhaustive nature.

The polymer is generally subsequently extruded or formed according to stage e) of the process of the invention.

According to a specific embodiment of the process of the invention, the polymer is formed into granules.

These granules are optionally postcondensed according to a method known to a person skilled in the art.

These granules are subsequently used in a large number of applications, in particular in the manufacture of yarns, fibres or filaments or in the forming of articles by moulding, injection moulding or extrusion. They can in particular be used in the field of high-performance plastics, generally after a formulation stage.

Other details or advantages of the invention will become more clearly apparent in the light of the examples given below.

EXAMPLES

The concentrations of antifoam and of caprolactam charged are respectively expressed in ppm and in % by weight, for respectively $10^6$ and 100 parts of 52% solution of N salt employed. The weight of solution of N salt employed in Comparative Example A and in Example 1 is the same; likewise, the amounts of solution of N salt employed per unit of time in Comparative Example B and in Example 2 are the same.

Comparative Example A

Addition of Caprolactam Before the Stage of Concentration in a Batch Process

A polyamide 6,6/6 is prepared from a 52% by weight aqueous solution of N salt charged to an evaporator heated using an internal coil and an external jacket, with 11.8 ppm of antifoam and 6.9% by weight of caprolactam in the form of an aqueous solution (comprising 75% by weight of caprolactam). The solution is heated up to 130° C. under an absolute pressure of 0.15 MPa. At the end of the evaporation, the concentration of solution is 78% by weight. This solution is heated up to 160° C. without evaporation (superheating phase). The solution is subsequently transferred into an autoclave. The autoclave is heated so as to reach an autogenous pressure of 1.75 MPa. This pressure is subsequently regulated at 1.75 MPa. The phase of polymerization under pressure lasts 65 min and then the pressure is gradually reduced down to atmospheric pressure. The reactor is maintained under reduced pressure for 20 minutes and the temperature reached by the reaction mass at the end of this stage is 272° C. The reactor is then placed under a nitrogen pressure of between 0.3 and 0.4 MPa in order to be able to extract the polymer in the form of rods, cooled with water and cut up so as to obtain granules.

The polyamide 6,6/6 obtained has a relative viscosity of 50, measured in 90% formic acid, at a concentration of 8.4% by weight, and a melting point of 240° C., corresponding to a composition of 6,6/6 copolymer of 88/12 (% by weight).

Example 1

Addition of Caprolactam After Stage a) of Concentration in a Batch Process

A polyamide 6,6/6 is prepared from a 52% by weight aqueous solution of N salt charged to an evaporator heated using an internal coil and an external jacket, with 11.5 ppm of antifoam. The solution is heated up to 130° C. under an absolute pressure of 0.15 MPa. At the end of the evaporation, the concentration of the solution is 78% by weight. During the superheating phase (heating up to 160° C. without evaporation), when the temperature reaches 150° C., 6.5% by weight of caprolactam in the form of an aqueous solution (aqueous solution identical to that of Comparative Example A) are added to the solution. This solution is subsequently heated up to 160° C. before being transferred into an autoclave. The autoclave is heated so as to reach an autogenous pressure of 1.75 MPa. This pressure is subsequently regulated at 1.75 MPa. The phase of polymerization under pressure lasts 65 min and then the pressure is gradually reduced down to atmospheric pressure. The reactor is maintained under reduced pressure for 20 minutes and the temperature reached by the reaction mass at the end of this stage is 272° C. The reactor is then placed under a nitrogen pressure of between 0.3 and 0.4 MPa in order to be able to extract the polymer in the form of rods, cooled with water and cut up so as to obtain granules.

The polyamide 6,6/6 obtained has a relative viscosity of 50, measured in 90% formic acid, at a concentration of 8.4% by weight, and a melting point of 240° C., corresponding to a composition of 6,6/6 copolymer of 88/12 (% by weight).

Example 1, compared with Comparative Example A, shows that, in order to obtain a copolyamide having a given proportion of units resulting from caprolactam, a smaller amount of caprolactam is employed in the case of the batch process of the invention (introduction of lactam after the stage of concentration) than in the case of a batch process as described in the prior art (introduction of lactam before the stage of concentration), this being related mainly to the losses of caprolactam generated during the stage of concentration in the case of the process of the prior art.

Specifically, the process according to Example 1 makes it possible to divide by 2 the caprolactam losses, as is shown by the calculation below:

In order to obtain 100 kg of a 6,6/6 copolyamide with the composition PA6,6: 88/PA6: 12 and when there is no caprolactam loss, it is necessary to introduce:

Amount of 52% N salt: (88×262.35)/(226.32×0.52)=196.2 kg 262.35 being the molar mass of the N salt 226.32 being the molar mass of a PA6,6 unit 0.52 being the fraction by weight of N salt in the solution Amount of caprolactam: 12 kg, i.e. a percentage by weight of caprolactam of 12/196.2 =6.12%.

In Comparative Example A, it was necessary to introduce 6.9% of caprolactam, i.e. 0.78% of losses.

In Example 1, it was necessary to introduce 6.5% of caprolactam, i.e. 0.38% of losses.

The caprolactam losses were thus divided by 0.78/0.38≈2.

Comparative Example B

Addition of Caprolactam Before the Stage of Concentration in a Continuous Process A polyamide 6,6/6 is prepared from a 52% by weight aqueous solution of N salt, which is mixed beforehand in a stirred vessel with 2 ppm of antifoam and 1.30% by weight of caprolactam in the molten form. This mixture feeds an evaporator heated using an internal coil, where it is heated up to 113.5° C. under an absolute pressure of 0.116 MPa. At the end of the evaporation, the concentration of the solution is 66% by weight. This solution is subsequently heated via a heat-exchange fluid up to 215° C. by passing through a tubular exchanger. The solution subsequently feeds a partially filled horizontal-axis reactor, where it is heated up to 250° C. under an autogenous pressure regulated at 1.85 MPa by removal of steam through a regulating valve. The residence time in this horizontal reactor is 60 min. The polycondensation reaction takes place therein and forms a prepolymer. This prepolymer is subsequently sent to a flasher and heated up to 280° C., at the same time as the pressure is reduced to atmospheric pressure. A mixture of prepolymer and of steam is formed, which mixture is directed to a horizontal finisher where the steam is separated from the prepolymer and where the reaction continues.

This finisher is stirred and heated at 280° C. by a heat-exchange fluid. A gear pump subsequently transfers the polymer to a die block. The rods which exit from the die are cooled and cut up through a granulation system.

The polyamide 6,6/6 obtained has a relative viscosity of 41, measured in 90% formic acid, at a concentration of 8.4% by weight, and a melting point of 257.5° C., corresponding to a composition of 6,6/6 copolymer of 97.5/2.5 (% by weight).

Example 2

Addition of Caprolactam After Stage a) of Concentration in a Continuous Process

A polyamide 6,6/6 is prepared from a 52% by weight aqueous solution of N salt, which is mixed beforehand in a stirred vessel with 2 ppm of antifoam. This mixture feeds an evaporator heated using an internal coil, where it is heated up to 113.5° C. under an absolute pressure of 0.116 MPa. At the end of the evaporation, the concentration of the solution is 66% by weight. 1.19% by weight of caprolactam in the molten form is mixed with the concentrated solution of N salt in the transfer line downstream of the evaporator. This mixture is subsequently heated via a heat-exchange fluid up to 215° C. by passing through a tubular exchanger. The solution subsequently feeds a partially filled horizontal-axis reactor, where it is heated up to 250° C. under an autogenous pressure regulated at 1.85 MPa by removal of steam through a regulating valve. The residence time in this horizontal reactor is 60 min. The polycondensation reaction takes place therein and forms a prepolymer. This prepolymer is subsequently sent to a flasher and heated up to 280° C., at the same time as the pressure is reduced to atmospheric pressure. A mixture of prepolymer and of steam is formed, which mixture is directed to a horizontal finisher where the steam is separated from the prepolymer and where the reaction continues.

This finisher is stirred and heated at 280° C. by a heat-exchange fluid. A gear pump subsequently transfers the polymer to a die block. The rods which exit from the die are cooled and cut up through a granulation system.

The polyamide 6,6/6 obtained has a relative viscosity of 41, measured in 90% formic acid, at a concentration of 8.4% by weight, and a melting point of 257.5° C., corresponding to a composition of 6,6/6 copolymer of 97.5/2.5 (% by weight).

Example 2, compared with Comparative Example B, shows that, in order to obtain a copolyamide having a given proportion of units resulting from caprolactam, a smaller amount of caprolactam is employed in the case of the continuous process of the invention (introduction of lactam after the stage of concentration) than in the case of a continuous process as described in the prior art (introduction of lactam before the stage of concentration), this being related mainly to the losses of caprolactam generated during the stage of concentration in the case of the process of the prior art.

Specifically, the process according to Example 2 makes it possible to divide by 3.75 the caprolactam losses, as is shown by the calculation below: In order to obtain 100 kg of a 6,6/6 copolyamide with the composition PA6,6: 97.5/PA6: 2.5 and when there is no caprolactam loss, it is necessary to introduce:

Amount of 52% N salt: (97.5×262.35)/(226.32×0.52)= 217.35 kg 262.35 being the molar mass of the N salt 226.32 being the molar mass of a PA6,6 unit 0.52 being the fraction by weight of N salt in the solution Amount of caprolactam: 2.5 kg, i.e. a percentage by weight of caprolactam of 2.5/217.35 =1.15%.

In Comparative Example B, it was necessary to introduce 1.30% of caprolactam, i.e. 0.15% of losses.

In Example 2, it was necessary to introduce 1.19% of caprolactam, i.e. 0.04% of losses.

The caprolactam losses were thus divided by 0.15/0.04=3.75.

The invention claimed is:

1. A process for the manufacture of a polyimide from at least one diacid, at least one diamine and at least one lactam, the process comprising the following stages:

a) concentrating by evaporation of water, an aqueous solution of salt of diacid and diamine obtained by mixing at least one diacid and at least one diamine,
b) polymerizing under pressure, the concentrated aqueous solution,
c) reducing, under pressure, the polymerization medium in order to remove residual water by evaporation,
d) optionally maintaining at temperature of the polyamide, at atmospheric pressure or under reduced pressure, in order to obtain a desired degree of polymerization, and
e) optionally forming of the polyamide obtained,
wherein the lactam is introduced into the solution or the polymerization medium at the end of stage a) or after stage a);
and wherein a proportion of monomer units resulting from the lactam in the final polyamide, by weight with respect to the weight of final polyamide, is between 5% to 20%.

2. The process as defined in claim 1, wherein the lactam is introduced before stage d).

3. The process as defined in claim 2, wherein the lactam is introduced before stage b).

4. The process as defined in claim 1, wherein the aqueous solution of salt of diacid and diamine, before it is concentrated according to stage a), does not comprise lactam.

5. The process as defined in claim 1, wherein the concentration by weight of salt in the aqueous solution of salt of diacid and diamine, before stage a), is from 40% to 70%.

6. The process as defined in claim 1, wherein the concentration by weight of salt in the aqueous solution of salt of diacid and diamine, after stage a), is from 55% to 90%.

7. The process as defined in claim 1, wherein the mixture obtained on conclusion of stage a) is transferred into at least one polymerization reactor.

8. The process as defined in claim 1, wherein during stage e), the polyamide obtained is formed into granules.

9. The process as defined in claim 1, wherein the diacid is a monomer selected from the group consisting of: an adipic acid, a glutaric acid, a suberic acid, a sebacic acid, a dodecanedioic acid, an isophthalic acid, a terephthalic add, an azelaic acid, a pimelic acid, a naphthalenedicarboxylic acid, a 5-sulphoisophthalic acid, and a mixture thereof.

10. The process as defined in claim 1, wherein the is a monomer selected from the group consisting of: a hexamethylenediamine, a heptamethylenediamine, a tetramethylenediamine, a pentamethylenediamine, a octamethylenediamine, a nonamethylenediamine, a decamethylenediamine, a 2-methylpentamethylenediamine, an undecamethylenediamine, a dodecamethylenediamine, a xylylenediamine, an isophoronediamine, and a mixture thereof.

11. The process as defined in claim 1, wherein the lactam is a monomer selected from the group consisting of: a caprolactam, a dodecanolactam, a butyrolactam, a valerolactam, an undecanolactam, and a mixture thereof.

12. The process as defined in claim 9, wherein the diacid monomer comprises at least 80 mol % of adipic acid.

13. The process as defined in claim 10, wherein the diamine monomer comprises at least 80 mol % of hexamethylenediamine.

14. The process as defined by claim 11, wherein the lactam is a comonomer comprising at least 80 mol % of caprolactam.

15. The process as defined by claim 1, wherein the proportion of monomer units resulting from the lactam in the final polyamide, by weight with respect to the weight of final polyamide is from 10% to 15%.

* * * * *